United States Patent Office 3,149,009
Patented Sept. 15, 1964

3,149,009
SOLID ROCKET PROPELLANT COMPOSITIONS
Otho D. Ratliff, Jr., McGregor, Tex., assignor, by mesne assignments, to the United States of America as represented by the Secretary of the Air Force
No Drawing. Filed Apr. 25, 1957, Ser. No. 655,159
10 Claims. (Cl. 149—19)

This invention relates to solid propellants for rockets. This application is a continuation-in-part of my application Serial No. 606,529, filed August 27, 1956, now abandoned.

Rocket propellants have achieved considerable importance in commercial as well as military applications. They are used to aid take-off of heavily loaded planes, as auxiliary power units where an extra surge of power is required, and to serve as the primary power of projectiles.

The following are objects of this invention.

An object of this invention is to provide new solid rocket propellants. A further object of this invention is to provide propellants having improved physical properties and ballistic properties. A further object of this invention is to provide rocket propellants having high specific impulse. A further object of this invention is to provide a new method of preparing rocket propellants. A further object of this invention is to provide propellants containing silica as the reinforcing agent.

Other objects and advantages of this invention will become apparent to those skilled upon reading the accompanying disclosure.

This invention is particularly directed to contemporary rocket propellants of the type which employ a solid oxidant and a copolymeric binder, such as a copolymer of 1,3-butadiene and 2-methyl-5-vinylpyridine. I have discovered that the properties of the propellants are improved by using liquid diene polymers, such as liquid polybutadiene, as a vulcanizable plasticizer in the composition. The use of this vulcanizable plasticizer permits a higher oxidizer content and/or improved physical properties such as higher tensile strength and a high modulus of elasticity. The use of this plasticizer also permits incorporation of at least 80 parts of ammonium perchlorate per 100 parts of propellant, the use of this oxidant providing increased specific impulse because of the higher temperatures obtained and the formation of more monomers of gas per pound of propellant when compared to propellants using ammonium nitrate as the oxidant.

Another feature of my invention is the replacement of carbon black by silica as the reinforcing agent in the composition. Use of silica decreases the burning rates and the propellants have a slightly increased pressure exponent. Prior to my invention, it was the general opinion that silica could not be tolerated as the sole reinforcing agent in such propellants because silica does not burn. However, as shown earlier, the burning rate is lowered by the use of silica and the physical properties of the propellant are improved.

The following examples disclose compositions prepared according to my invention. These examples exemplify specific compositions suitable as solid rocket fuels but, of course, reasonable variation from the amounts shown can be employed.

EXAMPLE I

A butadiene/2-methyl-5-vinylpyridine copolymer was used as a binder to prepare a propellant composition. This copolymer, prepared by emulsion polymerization at 41° F., using a weight ratio of butadiene to 2-methyl-5-vinylpyridine of 90 to 10, had a Mooney (ML-4) of 150. The recipe was

|  | Parts by weight |
|---|---|
| Water | 180 |
| Butadiene | 90 |
| 2-methyl-5-vinylpyridine | 10 |
| Potassium OSR soap | 6.0 |
| KOH | 0.1 |
| KCl | 0.1 |
| Daxad 11 [1] | 0.2 |
| $K_4P_2O_7$ | 0.132 |
| $FeSO_4 \cdot 7H_2O$ | 0.111 |
| Cumene hydroperoxide | 0.067 |
| Sulfole | 0.51 |

[1] Sodium salt of condensed alkyl aryl sulfonic acid.

A conversion of 60 percent was reached in 9.8 hours, 0.15 part of Goodrite 3955 (50/50 mixture of sodium dimethyldithiocarbamate and sulfur in form of sodium polysulfide) was added as an antioxidant, and, based on the polymer, 2 parts of phenyl-beta-naphthylamine were added. Incorporated in the polymer, as a portion of the plasticizer was liquid polybutadiene prepared by sodium polymerization having viscosity of 1500 Saybolt Furol Seconds at 100° F. The recipe for the propellant was as follows:

| Ingredient | Rubber Hydrocarbon Content (phr.) | Weight Percent |
|---|---|---|
| Copolymer | 80.00 | 8.64 |
| Liquid polybutadiene | 20.00 | 2.16 |
| Silica | 20.00 | 2.16 |
| Zinc oxide | 5.00 | .54 |
| Magnesium oxide | 5.00 | .54 |
| Wood rosin | 1.00 | .10 |
|  | 131.00 | 14.14 |
| Liquid polybutadiene | 18.79 | 2.03 |
| ZP-211 [1] | 20.00 | 2.16 |
| SA-113 [2] | 1.00 | .10 |
| Sulfur | .75 | .08 |
|  | 171.54 | 18.51 |
| Ammonium nitrate |  | 82.20 |
| Milori blue |  | 1.89 |
|  |  | 102.60 |

[1] Dibutoxyethoxyethyl formal.
[2] N,N-dimethyl-tert-butylsulfenyldithiocarbamate.

The composition was cured at 175° F. for 12 hours and then aged for one week at 78° F. or 170° F., after which the phyiscal properties were determined, these physical properties being set forth in Table I.

Table I

| Aged | Elongation (percent) | Tensile (p.s.i.) | Youngs Modulus |
|---|---|---|---|
| 1 week at 78° F | 9 | 140 | 5,700 |
| 1 week at 170° F | 12 | 340 | 6,000 |

To determine the ballistic properties of this composition, strands were cured at 175° F. for 12 hours. The ballistic properties are set forth in Table II.

Table II

| r at 1,000 p.s.i. (in./sec.) | Pressure Exponent |
|---|---|
| 0.117 | 0.55 |

EXAMPLE II

Using the same copolymer and the same liquid polybutadiene as in Example I, a propellant composition was prepared in which silica was used as the sole reinforcing agent in accordance with the following recipe:

| Ingredient | Rubber Hydrocarbon Content (phr.) | Weight Percent |
|---|---|---|
| Copolymer | 80.00 | 8.64 |
| Liquid polybutadiene | 20.00 | 2.16 |
| Silica | 20.00 | 2.16 |
| Zinc oxide | 5.00 | .54 |
| Magnesium oxide | 5.00 | .54 |
| Wood rosin | 1.00 | .11 |
|  | 131.00 | 14.15 |
| ZP-211 [1] | 20.00 | 2.16 |
| SA-113 [1] | 1.00 | .11 |
| Sulfur [1] | .75 | .08 |
|  | 152.75 | 16.50 |
| Ammonium nitrate | 773.15 | 83.50 |
| Milori blue | 18.52 | 2.00 |
|  | 944.42 | 102.00 |

[1] As in Example I.

Physical properties of portions of this composition were determined, in the same manner as in Example I. These properties are set forth in Table III.

Table III

| Aged | Elongation (percent) | Tensile (p.s.i.) | Youngs Modulus |
|---|---|---|---|
| 1 week at 78° F | 9 | 160 | 5,300 |
| 1 week at 170° F | 11 | 410 | 9,200 |

The ballistic properties were also determined as in Example I and are set forth in Table IV.

Table IV

| r at 1,000 p.s.i. (in./sec.) | Pressure Exponent |
|---|---|
| 0.126 | 0.65 |

EXAMPLE III

As a control, a propellant composition was prepared in accordance with the prior art using carbon black as the reinforcing agent and omitting the vulcanizable plasticizer, the liquid polybutadiene. This composition was prepared from a copolymer prepared by polymerizing at 41° F. in aqueous emulsion butadiene and 2-methyl-5-vinylpyridine in a weight ratio of 90 parts of butadiene to 10 parts of 2-methyl-5-vinylpyridine. The polymer had a Mooney (ML–4) of 20. The recipe for this propellant composition was as follows:

| Ingredients | Phr. | Parts | Parts | Percent by Weight |
|---|---|---|---|---|
| Copolymer | 100 |  | 11.093 | 10.88 |
| Carbon black | 20 |  | 2.218 | 2.17 |
| TP-90B [1] | 20 |  | 2.218 | 2.17 |
| SA-113 [2] | 1 | 16.50 | 0.111 | 0.11 |
| Sulfur | 0.75 |  | 0.083 | 0.08 |
| Zinc oxide | 3 |  | 0.333 | 0.33 |
| Flexamine [3] | 3 |  | 0.333 | 0.33 |
| Aerosol OT [4] | 1 |  | 0.111 | 0.11 |
| Ammonium nitrate |  | 83.50 | 83.500 | 81.86 |
| Milori blue |  | 2.00 | 2.000 | 1.96 |
|  |  | 102.00 | 102.000 | 100.00 |

[1] Dibutoxyethoxyethyl formal.
[2] N,N-dimethyl-tert-butylsulfenyldithiocarbamate.
[3] Physical mixture containing 65 percent of a complex diarylaminoketone reaction product and 35 percent of N,N'-diphenyl-para-phenylenediamine.
[4] Dioctyl ester of sodium sulfosuccinic acid.

This composition was cured as in the prior examples and the physical properties determined, these physical properties being set forth in Table V.

Table V

| Elongation (Percent) | Tensile (p.s.i.) | Youngs Modulus |
|---|---|---|
| 9.7 | 220 | 4,100 |

Ballistic properties were determined on this propellant and these are set forth in Table VI.

Table VI

| r at 100 p.s.i. (in./sec.) | Pressure Exponent |
|---|---|
| 0.145 (strand) | 0.49 (strand). |

EXAMPLE IV

Another typical carbon black containing propellant was prepared according to the following recipe using a low Mooney copolymer of butadiene/2-methyl-5-vinylpyridine.

|  | Phr. | Weight Percent |
|---|---|---|
| Copolymer | 100 |  |
| Philblack A carbon black | 20 |  |
| TP-90B | 20 |  |
| Silica | 3 |  |
| Zinc oxide | 3 | 16.5 |
| Flexamine | 3 |  |
| Aerosol OT | 1 |  |
| SA-113 | 1 |  |
| Sulfur | 1 |  |
| Ammonium nitrate |  | 83.5 |
| Milori blue |  | 2.0 |

The physical properties of this propellant, after curing and aging one week at 170° F., are set forth in Table VII.

Table VII

| Elongation (Percent) | Tensile (p.s.i.) | Youngs Modulus |
|---|---|---|
| 13.2 | 320 | 4,700 |

Ballistic properties were determined on strands of this composition. These properties are set forth in Table VIII.

Table VIII

| r at 1,000 p.s.i. (in./sec.) | Pressure exponent |
|---|---|
| 0.145 | 0.52 |

EXAMPLE V

A butadiene/2-methyl-5-vinylpyridine copolymer was prepared by emulsion polymerization at 41° F. using a recipe of the following type.

| | Parts by weight |
|---|---|
| Butadiene | 90 |
| 2-methyl-5-vinylpyridine | 10 |
| Water | 200 |
| Potassium fatty acid soap | 6.0 |
| Potassium chloride | 0.1 |
| Sodium salt of formaldehyde/naphthalene sulfonic acid condensation product | 0.3 |
| Tetrasodium salt of ethylene diamine tetraacetic acid | 0.005 |
| Tert-dodecyl mercaptan | 0.5 |
| Ferrous sulfate heptahydrate | 0.2 |
| Potassium pyrophosphate | 0.253 |
| Para-menthane hydroperoxide | 0.1 |

A total of 55 batches were prepared with an average conversion of 85.9 percent. These were blended and the resulting rubber had a Mooney viscosity (ML-4) of 22.4. As a shortstop, 0.1 part of potassium dimethyldithiocarbamate was used and 1.76 percent by weight, based on the rubber, of phenyl-beta-naphthylamine was added as an oxidant.

This copolymer was prepared to produce propellant grains according to the following recipe.

| | Parts by weight |
|---|---|
| Copolymer | 12.94 |
| Philblack A carbon black | 2.91 |
| Liquid polybutadiene | 2.59 |
| Flexamine [1] | 0.39 |
| Zinc oxide | 0.39 |
| Magnesium oxide | 0.65 |
| Para-quinone dioxime | 0.13 |
| Ammonium perchlorate | 80.00 |

[1] As described in Example III.

The liquid polybutadiene used in this example was the same as that previously used. The composition was mixed in a Baker-Perkins mixer by a process wherein all of the ingredients except the oxidizer were mixed four minutes prior to the addition of the oxidizer. Thereafter, the oxidizer was added, 25 percent thereof being added in each increment with a two minute mixing time between each addition and with twenty minute mixing after a complete addtion. Good mixing was obtained throughout the entire procedure and a good grain resulted.

If the liquid polybutadiene is omitted and ZP-211 (dibutoxyethoxyethyl formal) substituted therefore, satisfactory mixing is not obtained. Only with the liquid polybutadiene is a coherent, moldable composition obtained.

Production of propellants containing loadings of 80 parts and more of ammonium perchlorate are made possible for the first time by operation in accordance with this example. Many prior attempts have been made to substitute this oxidizer for ammonium nitrate because of the greater amount of available oxidant therein. Ammonium perchlorate provides grains with higher specific impulse due to the higher temperature of burning which provides greater volume and because there are produced a greater number of mols of gas per pound of propellant.

A comparison of Examples I and II, illustrating the present invention, with Examples III and IV, illustrating the prior art, shows that the carbon black can be replaced by silica as the reinforcing agent in the propellant. Not only can the silica be used but the products have improved physical properties. These improved properties permit storage for longer periods of time and under more adverse conditions. The operating characteristics of the compositions are good. Furthermore, the use of the vulcanizable plasticizer is also effective in providing the new propellant compositions of this invention.

The silica used in Examples I and II was "Hi-Sil 202," this being a product of Columbia-Southern Chemical Corporation, the material being used as received. Other types of silica can, of course, be used and as representative compounds, there can be mentioned the following: Hi-Sil X303, Hi-Sil 233, and Cab-O-Sil. Suitable silica is that having an ultimate particle size between 10 and 20 millimicrons which has been treated so as to form by agglomeration discrete, amorphous particles in the 80 to 400 mesh range.

The liquid polybutadiene used as a plasticizer was prepared by mass polymerization process in the presence of finely divided sodium as the catalyst according to the method of Crouch, 2,631,175. Broadly, the plasticizers which can be used in accordance with this invention comprise liquid polymers prepared from conjugated diolefin hydrocarbons such as 1,3-butadiene and isoprene, the liquid polymers having a viscosity of 100 to 5000 Saybolt Furol Seconds at 100° F. These liquid polymers can be prepared by emulsion polymerization using large amounts of modifiers in accordance with the teaching of Frolich et al., 2,500,983 although, they are preferably prepared by the method set forth in Crouch, 2,631,175. The latter method comprises mass polymerization in the presence of finely divided alkali metal and/or alkali metal hydride such as sodium potassium, lithium, sodium hydride, potassium hydride and lithium hydride. Polymers thus prepared contain no modifiers or viscosity controlling agent and they are also free of materials which would act as inhibitors such as antioxidants and shortstops. Finely divided catalyst is used, preferably having a particle size below 200 microns, and generally below 100 microns in the range of 40 to 80 microns. The amount of catalyst employed usually does not exceed two parts by weight of the total monomer charged, preferably in the range of 0.5 to 1.5 parts by weight per 100 parts monomer. A more complete description of the process is set forth in the Crouch patent identified above. The binder in the rocket propellant is a solid polymer of a conjugated diene and a polymerizable heterocyclic nitrogen base.

The conjugated dienes employed are those containing from 4 to 6 carbon atoms per molecule and include 1,3-butadiene, isoprene, 2-methyl-1,3-butadiene, 2,3-dimethyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the polymeric binders of this invention.

Instead of using a single conjugated diene, a mixture of conjugated dienes can be employed. Thus, a mixture of 1,3-butadiene and isoprene can be employed as the conjugated diene portion of the copolymer.

The polymerizable heterocyclic nitrogen bases which are applicable for the production of the polymeric materials are those of the pyridine and quinoline series which are copolymerizable with a conjugated diene and contain one and only one

substituent wherein R is either hydrogen or a methyl group. That is, the substituent, which is attached to a nuclear carbon atom, is either a vinyl or an alpha-methylvinyl (isopropenyl) group. Of there compounds, the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially.

These heterocyclic nitrogen bases have the formula

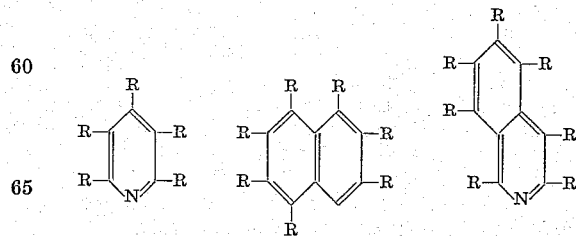

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 12. Examples of such compounds are 2-vinylpyridine;
2-vinyl-5-ethylpyridine;
2 methyl-5-vinylpyridine,
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentyl-3-vinylpyridine;
2-decyl-5(alpha-methylvinyl)pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-(para-methyl-phenyl)-3-vinyl-4-methylpyridine;
3-vinyl-5-(hydroxyphenyl)pyridine;
2-vinylquinoline;
2-vinyl-4-ethylquinoline;
3-vinyl-6,7-di-n-propylquinoline;
2-methyl-4-nonyl-6-vinylquinoline;
4-(alpha-methylvinyl)-8-dodecylquinoline;
3-vinylisoquinoline;
1,6-dimethyl-3-vinylisoquinoline;
2-vinyl-4-benzylquinoline;
3-vinyl-5-chloroethylquinoline;
3-vinyl-5,6-dichloroisoquinoline;
2-vinyl-6-ethoxy-7-methylquinoline;
3-vinyl-6-hydroxymethylisoquinoline; and the like.

When the vulcanizable liquid diene polymer is not used as a softener in the propellant composition, I prefer to use a copolymer having a Mooney (ML-4) value in the range of 15 to 30. When a liquid diene polymer is used as a softener, it is possible to use copolymers of a higher Mooney (ML-4) such as shown in Examples I and II of this disclosure. Broadly, the use of such softeners permits the use of copolymers having a Mooney (ML-4) value as high as 200, with 50 to 175 being a preferred range. The prior art has used polymers having a Mooney range of 10 to 30. When copolymers having Mooney values within this preferred range are used, I employ an amount of liquid diene polymer softener within the range of 20 to 70 parts by weight based upon the weight of the high Mooney copolymer.

The finished composition, in addition to the binder and oxidant usually contains additional compounding ingredients and a burning or combustion rate catalyst.

Curing catalysts which can be used in my propellants include vulcanizing agents, including sulfur and sulfur compounds such as tetramethylthiuram disulfide, tetraethylthiuram disulfide and the like; accelerators such as the condensation product of mercaptobenzothiazole and cyclohexylamine, mercaptobenzothiazole, benzothiazyldisulfide, dithiocarbamates, zinc oxide, stearic acid, and the like; antioxidants such as hydroquinone benzylether, phenyl-B-naphthylamine and the like; and other materials such as plasticizers and fillers.

Oxidants which are applicable in the solid propellant compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket propellant compositions, the oxidants are powdered to sizes preferably finer than 200 mesh. The amount of solid oxidant employed is usually a major amount of the total composition and is generally in the range between 50 and 90 percent by weight of the total mixture. If desired, however, less than 50 percent by weight of the oxidant can be used.

Commonly used combustion rate catalysts are metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Trunbull's blue are also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, are usually in the range of 1 to 60 parts per 100 parts of rubbery polymer with from 15 to 30 parts being most frequently preferred.

Wetting agents aid in deflocculating or dispersing the oxidizer. Aerosol OT (dioctyl ester of sodium sulfosuccinic acid), lecithin, and Duomeen C Diacetate (reaction product of acetic acid with the mono-salt formed from trimethylene diamine and coconut oil acid) are among the materials which can be employed.

The various ingredients in the propellant composition can be mixed on a roll mill or in an internal mixer such as a Banbury or a Baker-Perkins dispersion blade mixer can be employed. The binder forms a continuous phase in the propellant with the oxidant as the discontinuous phase. Grains are formed by compression molding, injection molding, or extrusion. The curing temperature is limited by the oxidizer in some cases but is generally in the range of 70 to 250° F., preferably between 140 and 180° F. The curing time must be long enough to give the required creep resistance and other mechanical properties in the propellant. This time generally ranges from around three hours when the higher curing temperatures are employed to about 30 days when curing is effected at lower temperatures.

As many possible embodiments can be made of this invention without departing from the scope thereof, it is to be understood that all matter herein set forth is to be interpreted as illustrative only and not as unduly limiting the invention.

I claim:
1. In a solid rocket propellant composition consisting essentially of a solid inorganic oxidizing salt in major amount and, as a binder, a minor amount of a copolymer of a conjugated diene containing 4 to 10 carbon atoms and a polymerizable heterocyclic nitrogen base selected from the group consisting of pyridine and quinoline having a

group attached to a nuclear carbon atom where R is selected from the group consisting of H and $CH_3$ and containing up to 12 carbon atoms attached to nuclear carbon atoms in addition to said

the improvement comprising having present in said propellant a liquid conjugated diene polymer selected from the group consisting of polymers of butadiene and isoprene as the plasticizer for said copolymer and silica as the sole reinforcing agent in said propellant wherein the said plasticizer is present in a quantity within the range of 20 to 70 parts by weight based upon the weight of the said copolymer, silica being present in a quantity substantially equal to the quantity of plasticizer present.

2. In a solid rocket propellant composition consisting essentially of a solid inorganic oxidizing salt in major amount and, as a binder, a minor amount of a copolymer of a conjugated diene containing 4 to 10 carbon atoms and a polymerizable heterocyclic nitrogen base selected from the group consisting of pyridine and quinoline having a

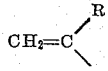

group attached to a nuclear carbon atom where R is selected from the group consisting of H and CH$_3$ and containing up to 12 carbon atoms attached to nuclear carbon atoms in addition to said

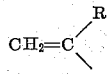

the improvement comprising having present in said propellant a liquid conjugated diene polymer selected from the group consisting of polymers of butadiene and isoprene as the sole plasticizing agent and silica as the sole reinforcing agent in said propellant wherein the said plasticizer is present in a quantity within the range of 20 to 70 parts by weight based upon the weight of the said copolymer, silica being present in a quantity substantially equal to the quantity of plasticizer present.

3. In a solid rocket propellant composition consisting essentially of ammonium nitrate as the oxidizing salt a major amount and, as the binder, a minor amount of a copolymer of 2-methyl-5-vinylpyridine and butadiene, the improvement comprising having present in said propellant liquid polybutadiene as the sole plasticizing agent and silica as the sole reinforcing agent in said propellant wherein the said plasticizer is present in a quantity within the range of 20 to 70 parts by weight based upon the weight of the said copolymer, silica being present in a quantity substantially equal to the quantity of plasticizer present.

4. In a rocket propellant composition consisting essentially of ammonium perchlorate in major amount and, as a binder, a minor amount of a copolymer of a conjugated diene containing 4 to 10 carbon atoms and a copolymerizable heterocyclic nitrogen base selected from the group consisting of pyridine and quinoline having a

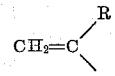

group attached to a nuclear carbon atom where R is selected from the group consisting of H and CH$_3$ and containing up to 12 carbon atoms attached to nuclear carbon atoms in addition to said

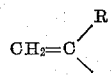

said ammonium perchlorate comprising at least 80 percent by weight of said propellant composition, the improvement comprising having present in said propellant liquid polybutadiene as the sole plasticizing agent and silica as the sole reinforcing agent in said propellant, wherein the said plasticizer is present in a quantity within the range of 20 to 70 parts by weight based upon the weight of the said copolymer, silica being present in a quantity substantially equal to the quantity of plasticizer present.

5. The composition of claim 4 wherein said copolymer is a conjugated diene-vinylpyridine copolymer.

6. The composition of claim 4 wherein said copolymer is a conjugated diene-vinylquinoline copolymer.

7. The composition of claim 4 wherein said copolymer is a butadiene-alkylvinylpyridine copolymer.

8. The composition of claim 4 wherein said copolymer is a copolymer of 1,3-butadiene and 2-methyl-5-vinylpyridine.

9. The composition of claim 4 wherein said copolymer is a copolymer of 1,3-butadiene and 2-vinylpyridine.

10. The composition of claim 4 wherein said copolymer is a copolymer of 1,3-butadiene and 2-ethyl-5-vinylpyridine.

References Cited in the file of this patent

UNITED STATES PATENTS

| | | |
|---|---|---|
| 2,159,234 | Taylor | May 23, 1939 |
| 2,622,277 | Bonell et al. | Dec. 23, 1952 |
| 2,631,175 | Crouch | Mar. 10, 1953 |
| 2,877,504 | Fox | Mar. 17, 1959 |

OTHER REFERENCES

Blatz: Industrial and Eng. Chem., vol. 48, No. 4, April 1956, pp. 727–729.